US006986295B2

(12) United States Patent
Kajino et al.

(10) Patent No.: US 6,986,295 B2
(45) Date of Patent: Jan. 17, 2006

(54) TRANSMISSION FOR WORK VEHICLE HAVING PTO FUNCTION

(75) Inventors: Masayori Kajino, Sakai (JP); Tatsuyuki Kashimoto, Sakai (JP); Megumi Sawai, Sakai (JP)

(73) Assignee: Kubota Corporation, Osaka (JP)

( * ) Notice: Subject to any disclaimer, the term of this patent is extended or adjusted under 35 U.S.C. 154(b) by 37 days.

(21) Appl. No.: 10/796,554

(22) Filed: Mar. 9, 2004

(65) Prior Publication Data

US 2004/0244514 A1 Dec. 9, 2004

(30) Foreign Application Priority Data

May 21, 2003 (JP) ............................. 2003-143376
Feb. 12, 2004 (JP) ............................. 2004-035507

(51) Int. Cl.
*F16H 3/08* (2006.01)

(52) U.S. Cl. ........................................... 74/329; 74/325

(58) Field of Classification Search .................. 74/329, 74/331, 325, 330, 332, 665 F, 665 G, 665 GA, 74/665 T; 180/900, 53.1
See application file for complete search history.

(56) References Cited

U.S. PATENT DOCUMENTS 4,484,488 A 11/1984 Kato et al.
4,549,443 A * 10/1985 White ......................... 74/360
4,579,183 A 4/1986 Irikura et al.
4,721,002 A * 1/1988 Horii ........................... 74/329
4,727,759 A 3/1988 Yamaoka et al.
5,099,936 A 3/1992 Irikura et al.
5,613,401 A * 3/1997 Maurizio ..................... 74/325
5,913,950 A * 6/1999 Matsufuji .................. 74/730.1
5,947,218 A 9/1999 Ishimaru
6,889,569 B2 * 5/2005 Morimoto et al. ............ 74/335

FOREIGN PATENT DOCUMENTS

JP 58-102848 6/1983
JP 1-11550 4/1989

* cited by examiner

*Primary Examiner*—Roger Pang
*Assistant Examiner*—Justin K. Holmes
(74) *Attorney, Agent, or Firm*—The Webb Law Firm

(57) ABSTRACT

A transmission for a work vehicle having PTO function is disclosed. The transmission includes a first transmission shaft for receiving engine power through a PTO power train, a second transmission shaft for receiving, the engine power through a traveling power train, the second transmission shaft being coupled to a rear differential mechanism, a third transmission shaft coupled to a rear PTO, a fourth transmission shaft for receiving force from the second transmission shaft, a first gear transmission mechanism for transmitting the force from the first transmission shaft to the third transmission shaft. The first gear transmission mechanism has an input gear mounted on the first transmission shaft, an output gear mounted on the third transmission shaft and a relay gear loosely mounted on the second transmission shaft for transmitting the force from the input gear to the output gear. The transmission further includes a second gear transmission mechanism for transmitting the force from the second transmission shaft to the fourth transmission shaft. This second gear transmission mechanism has an input gear mounted on the second transmission shaft, an output gear mounted on the fourth transmission shaft and a relay gear loosely mounted on the third transmission shaft for transmitting the force from the input gear to the output gear.

6 Claims, 6 Drawing Sheets

TRANSMISSION FOR WORK VEHICLE HAVING PTO FUNCTION

BACKGROUND OF THE INVENTION

1. Field of the Invention

The present invention relates to a transmission for a work vehicle having PTO function for transmitting a force to an implement mounted on a vehicle body.

2. Description of the Related Art

With the transmission of the above-noted type, conventionally, as known from e.g. Japanese Patent Application "Kokai" No.: Sho. 58-102848 (FIGS. 1 and 3), a drive force from an engine is divided between a vehicle traveling force and an implement driving force through first and second multiple-plate friction clutches and an intermediate transmission shaft included in the first multiple-plate friction clutch, respectively. The implement driving force from the intermediate transmission shaft is inputted to a PTO change-speed mechanism housed in a transmission case, so that the force is subjected to a change-speed operation by this PTO change-speed mechanism and then this speed-reduced force is transmitted to a rear PTO shaft. On the other hand, the vehicle traveling force from the first and second multiple-plate friction clutches is subjected to an auxiliary change-speed operation by an auxiliary change-speed mechanism including small and large gears mounted on a change-speed shaft and a shift gear mounted on a bevel-pinion shaft and then this force is transmitted to a rear-wheel differential mechanism.

In the case of this conventional work vehicle transmission having PTO function, in the number of speeds available from the auxiliary change-speed mechanism is to be increased, this will result in enlargement of the auxiliary change-speed mechanism, thus requiring a large space for accommodating the mechanism. This then requires enlargement of the differential case. Such enlargement of the differential case results in increase of the wheel base of the vehicle. For avoiding such increase of wheel base, there arises the necessity of reducing the length of the transmission case which is formed separately from the differential case and which accommodates such mechanisms as a main change-speed unit for traveling, a reduction mechanism for the implement. However, if the length of the transmission case is reduced, this will impose significant restriction in the spatial arrangement of the above-described components accommodated within the case.

In the case of a further conventional transmission known from Japanese Utility Model Application "Kokai" No. Hei. 1-11550 (FIGS. 3 and 5), a rear PTO shaft (shown at 1 in FIGS. 3 and 5 of the document) is disposed at a rear portion of the vehicle body and a mid PTO shaft (shown at 3 in FIGS. 3 and 5) is disposed forwardly of the rear PTO shaft. With this arrangement, for instance, if a lawn mower implement is disposed between the front wheels and the rear wheels and a grass collector and a blower are disposed on the rear portion of the vehicle body, the lawn mower implement can be driven by the mid PTO shaft and the blower can be driven by the rear PTO shaft so that grass or lawn cut by the mower can be drawn by the blower to be collected into the collector. With the work vehicle having this type of transmission, there often occurs a situation of the lawn mower implement being driven by the force from the mid PTO shaft. For this reason, it is necessary to transmit high-speed force to the mid PTO shaft and to dispose this mid PTO shaft at a low position. Further, the force from the engine is transmitted to a transmission gear (shown at 38 in FIGS. 3 and 5) and force from this transmission gear is transmitted from a switchover slider (shown at 36 in FIGS. 3 and 5) through a retaining portion and a transmission shaft (shown respectively at 37 and 11 in FIGS. 3 and 5) to the rear PTO shaft. The force from the transmission gear (shown at 38 in FIGS. 3 and 5) is transmitted via the switchover slider (shown at 36 in FIGS. 3 and 5) through transmission gears (shown at 35, 42 in FIGS. 3 and 5) to the mid PTO shaft disposed at the low position. In this case, the transmission gears are set to provide an accelerating gear ratio for transmitting a high-speed force to the mid PTO shaft. With the transmission of the above construction, a transmission gear is mounted coaxially relative to a transmission gear receiving the power from the engine, which transmission gear is meshed with a transmission gear mounted on the mid PTO shaft. In this case, there is a limit in possible enlargement of the transmission gear for transmitting high-speed force to the mid PTO shaft (this is probably attributable to the fact the transmission gear acts as a point of force division between the force to the rear PTO shaft and the force to the mid PTO shaft). Hence, it is necessary to allow transmission of high-speed force to the mid PTO shaft by minimizing the diameter of the transmission gear mounted on the mid PTO shaft. However, if this transmission gear (shown at 3 in FIGS. 3 and 5) mounted on the mid PTO shaft is reduced in diameter, this will result in corresponding rising of the disposing position of the mid PTO shaft.

SUMMARY OF THE INVENTION

In view of the above, a primary object of the present invention is to provide a transmission for a work vehicle having PTO function, which allows transmission of PTO driving force in speed reduced state to the rear PTO shaft and which also allows the differential case area to be formed compact. Further, in the case of a type of transmission in which a rear PTO shaft is disposed at a rear portion of a vehicle body and a mid PTO shaft is disposed forwardly of the rear PTO shaft, an object of the invention is to allow the mid PTO shaft to be disposed at a as low as possible position and to allow transmission of high-speed force to the mid PTO shaft also.

For accomplishing the above-noted objects, a transmission for a work vehicle having PTO function, according to the present invention, comprises:

- a first transmission shaft for receiving engine power through a PTO power train;
- a second transmission shaft for receiving the engine power through a traveling power train, said second transmission shaft being coupled to a rear differential mechanism;
- a third transmission shaft coupled to a rear PTO;
- a fourth transmission shaft for receiving force from the second transmission shaft;
- a first gear transmission mechanism for transmitting the force from the first transmission shaft to the third transmission shaft;
- said first gear transmission mechanism including;
  - an input gear mounted on the first transmission shaft,
  - an output gear mounted on the third transmission shaft, and
  - a relay gear loosely mounted on the second transmission shaft for transmitting the force from the input gear to the output gear;
- a second gear transmission mechanism for transmitting the force from the second transmission shaft to the fourth transmission shaft; and said second gear transmission mechanism including;

an input gear mounted on the second transmission shaft, an output gear mounted on the fourth transmission shaft, and a relay gear loosely mounted on the third transmission shaft for transmitting the force from the input gear to the output gear.

With the above-described construction, the relay gear of the first gear transmission mechanism for transmitting the force of the first transmission shaft as the PTO driving force to the third transmission shaft utilizes the second transmission shaft for its loose (rotatable) mounting thereof. And, the relay gear of the second transmission mechanism for transmitting the force of the second transmission shaft as the vehicle traveling force to the fourth transmission shaft utilizes the third transmission shaft for its loose (rotatable) mounting thereof. With this, the rear wheel differential area of the transmission is formed compact.

According to one preferred embodiment of the present invention, the transmission further comprises a mid PTO shaft and a third gear transmission mechanism for transmitting the force from the first gear transmission mechanism to the mid PTO shaft, and said third gear transmission mechanism includes an output gear mounted on the mid PTO shaft, a first relay gear loosely mounted on the third transmission shaft for receiving the force from the first gear transmission mechanism and a second relay gear loosely mounted on the fourth transmission shaft and meshing with said first relay gear and said output gear.

With the above construction, the third transmission shaft and the fourth transmission shaft are interposed between the second transmission shaft coupled to the rear wheel differential mechanism and the mid PTO shaft, and the force from the first gear transmission mechanism is transmitted via the third gear transmission mechanism to the mid PTO shaft. Accordingly, the mid PTO shaft can be disposed at a low position.

With the invention's feature as above, the gear ratio of the third gear transmission mechanism can be selected relatively freely. Hence, high-speed force may be transmitted to the mid PTO shaft. In this case, since the output gear of the third transmission mechanism has a small diameter, there is obtained another auxiliary advantage that the outer peripheral portion of the output gear does not project significantly downward from the mid PTO shaft (i.e. the case covering the mid PTO shaft and the input gear does not project downward significantly).

According to a further preferred embodiment of the present invention, said first transmission shaft mounts a PTO clutch. With this, by selectively operating this PTO clutch into a transmitting condition or a non-transmitting condition, the third transmission shaft coupled to the rear PTO and the mid PTO shaft can be driven or stopped as the same time. Therefore, in the case of the aforementioned construction in which a lawn mower implement is disposed between the front wheels and the rear wheels and a grass collector and a blower are disposed on the rear portion of the vehicle body, the lawn mower can be driven by the mid PTO shaft and the blower can be driven by the rear PTO shaft so that grass or lawn cut by the mower can be drawn by the blower to be collected in the collector, by selectively operating the PTO cutch into the transmitting condition or the non-transmitting condition, the mower implement and the blower can be driven or stopped at the same time.

According to a still further preferred embodiment of the present invention, the transmission further comprises a mid PTO clutch interposed between the third gear transmission mechanism and the mid PTO shaft. With this construction, by selectively operating this mid PTO clutch into the transmitting condition or the non-transmitting condition, the mid PTO shaft can be driven or stopped independently. Therefore, in case no implement is provided between the front and rear wheels but an implement is provided at a rear portion of the vehicle body, by operating the mid PTO clutch into the non-transmitting condition, such inconvenience of the mid PTO shaft being driven unnecessarily can be avoided.

According to a still further preferred embodiment of the present invention, said relay gear of the first gear transmission mechanism includes a gear portion meshing with the input gear of the first gear transmission mechanism, a further gear portion meshing with the output gear of the first gear transmission mechanism and a still further gear portion meshing with the first relay gear of the third gear transmission mechanism. With this construction, the construction of the first gear transmission mechanism for transmitting the force to both the third transmission shaft and the third gear transmission mechanism can be formed compact.

Further and other features and advantages of the present invention will become apparent upon reading the following detailed disclosure of the invention with reference to the accompanying drawings.

DESCRIPTION OF THE PREFERRED EMBODIMENTS

Figure 1:
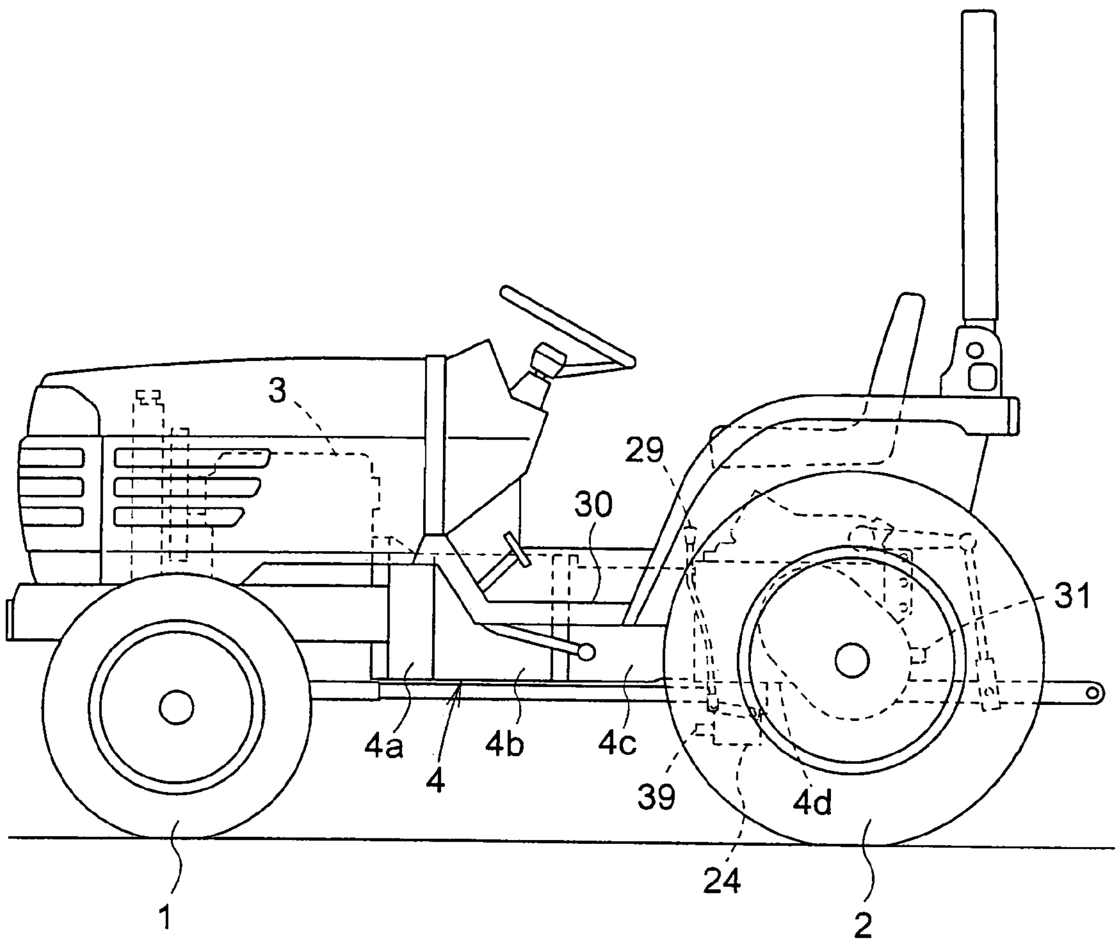
FIG. 1 is an overall side view of a tractor.
Figure 2:
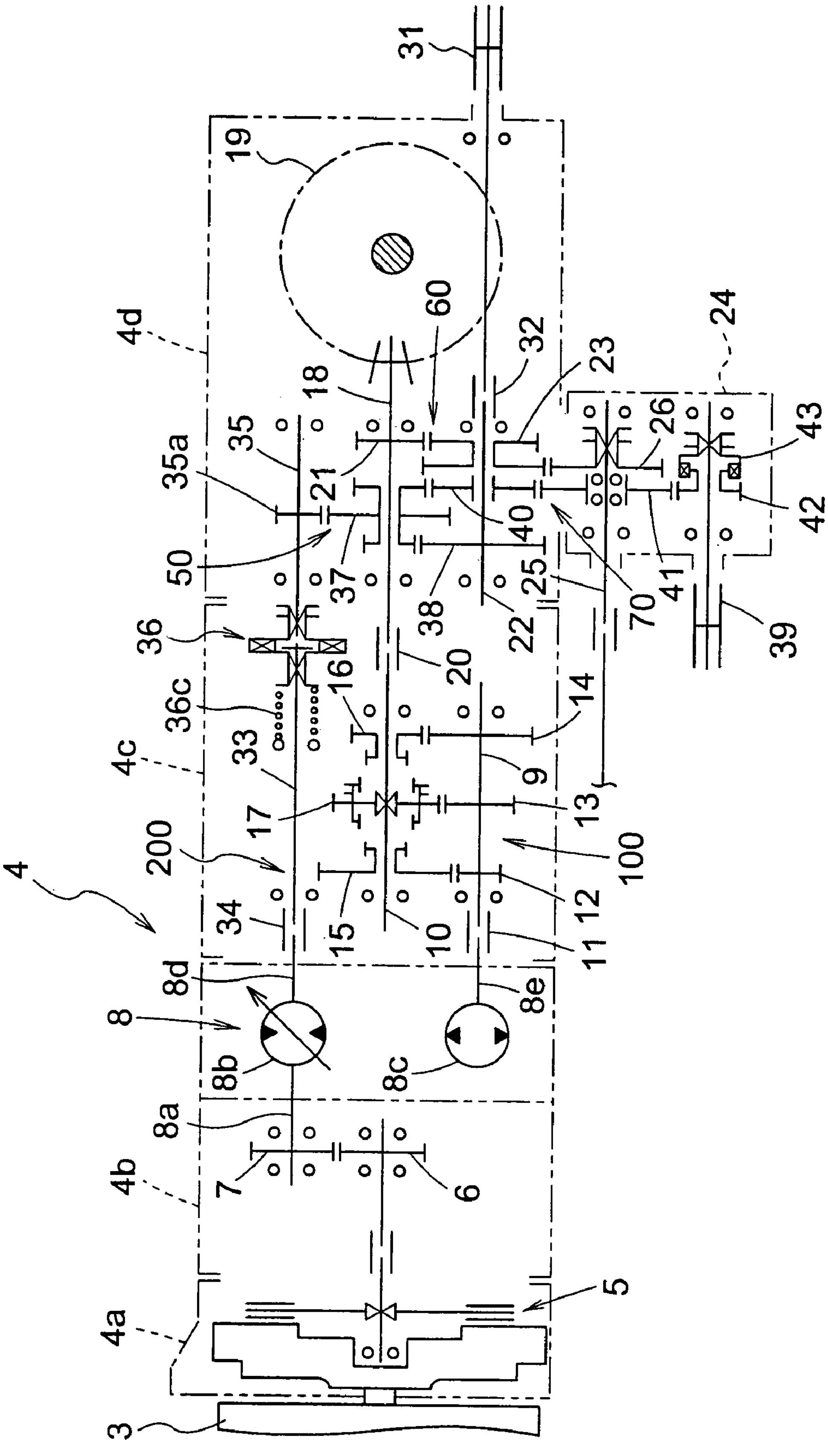
FIG. 2 is a schematic showing an inside of a transmission case.

FIG. 1 shows a tractor, as an example of a work vehicle, having a vehicle body supported on front wheels 1 and rear wheels 2, an engine 3 mounted on the body and a transmission case 4 mounted also on the body and connected to the engine 3. As shown in FIG. 1 and FIG. 2, the transmission case 4 comprises an interconnected assembly of a first case portion 4*a*, a second case portion 4*b*, a third case portion 4*c* and a fourth case portion 4*d* in the mentioned order from the front side of the case.

Next, a vehicle traveling power train for transmitting engine power to the rear wheels 2 will be described.

As shown in FIG. 2, the first case portion 4*a* accommodates therein a main clutch 5 which receives the power from the engine 3. The second case portion 4*b* of the transmission case 4 accommodates transmission gears 6, 7 and a hydrostatic stepless change-speed unit (HST) 8. And, the force from the main clutch 5 is transmitted via the transmission gears 6, 7 to an input shaft 8*a* of the HST 8. This HST 8, when moved from its neutral position, can change speed of the force in stepless manner to a high speed side or to low speed side.

As shown in FIG. 2, the third case portion 4*c* of the transmission case 4 accommodates therein transmission shafts 9, 10, and an output shaft 8*e* of a hydraulic motor 8*c* of the HST 8 is coupled via a coupling 11 to the transmission shaft 9. This transmission shaft 9 fixedly mounts thereon a low speed gear 12, a mid speed gear 13 and a high speed gear 14. Whereas, the transmission shaft 10 loosely or rotatably mounts thereon transmission gears 15, 16 which are meshed with the low speed gear 12 and the high speed gear 14. A shift gear 17 is mounted, via a splined connection, on this transmission shaft 10 to be slidable thereon and rotatable therewith. These constitute a gear change-speed unit for changing the rotation of the output shaft 8*e* of the hydraulic motor 8*c* of the HST 8 in three speeds by sliding the shift gear 17 for meshing the transmission gears 15, 16 and the mid speed gear 13. And, a speed-changed output from this unit is then transmitted to the transmission shaft 10. That is to say, this gear change-speed unit, the HST 8 and the transmission shaft 10 together constitute a traveling power train section 100 as a forward half portion of the vehicle traveling power train.

Figure 3:
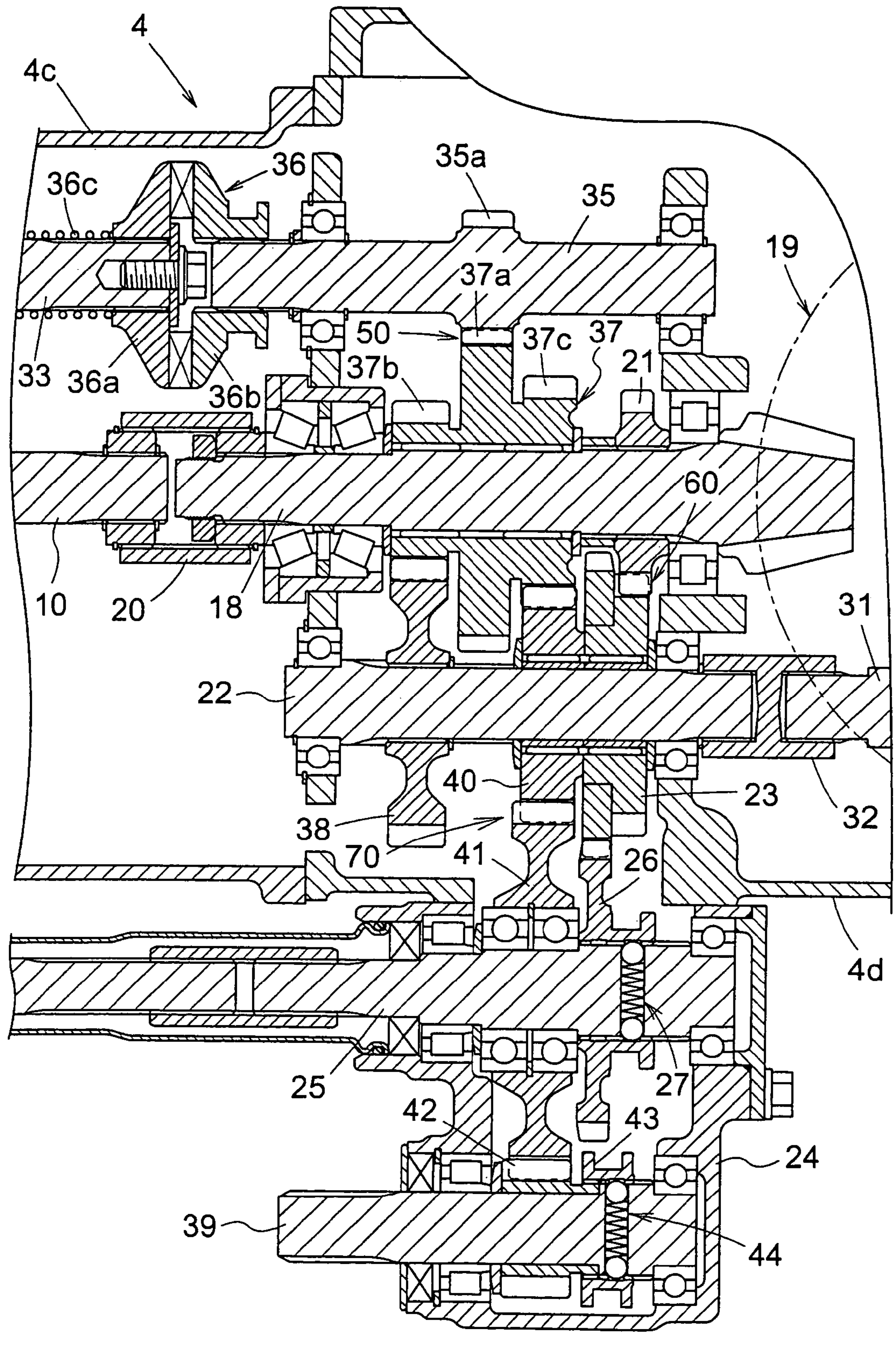
FIG. 3 is a side view in vertical section showing vicinity of a PTO transmission gear of the transmission case and an output case.

As shown in FIGS. 2 and 3, the fourth case portion 4*d* of the transmission case 4 accommodates therein a rear wheel transmission shaft 18 (to be referred to as "second transmission shaft" hereinafter) and a rear wheel differential mechanism 19 directly coupled with this second transmission shaft 18. Further, the transmission shaft 10 is coupled via a coupling 20 to this second transmission shaft 18. With the above-described construction in operation, the power of the engine 3 is transmitted to the rear wheels 2 via the main clutch 5, the HST 8 (the output shaft 8*e* of the hydraulic motor 8*c* of the HST 8) (steplessly changed in speed to high speed side in the forward drive direction and to high speed side in the reverse drive direction), the transmission shafts 9, 10 (changed in three speeds), the second transmission shaft 18 and the rear wheel differential mechanism 19.

Next, a transmission line to the front wheels 1 will be described.

Figure 4:
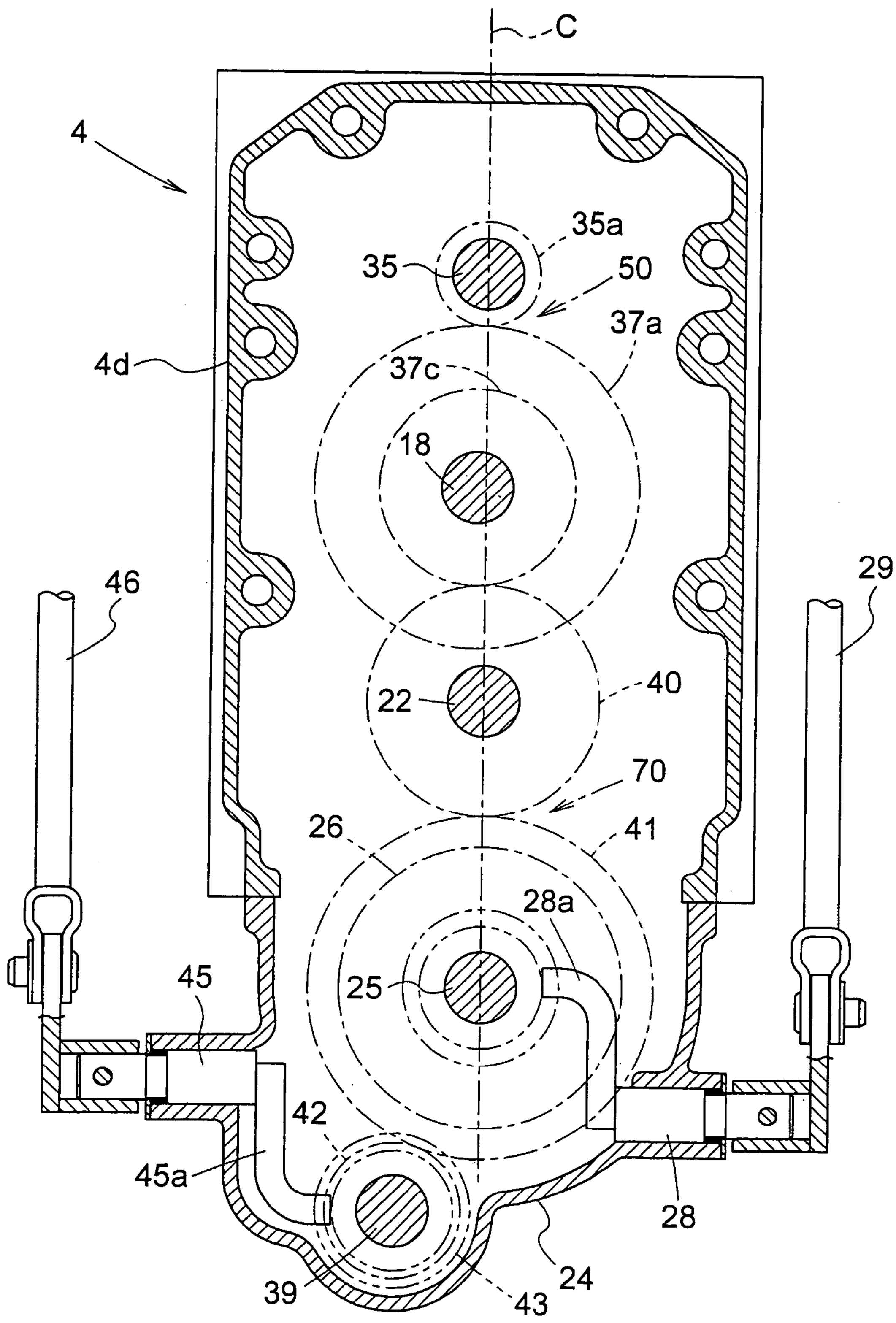
FIG. 4 is a front view in vertical section showing the vicinity of a PTO transmission gear of the transmission case and the output case.

As shown in FIGS. 2 and 3, a transmission gear 21 is fixedly mounted on the second on the second transmission shaft 18. The fourth case portion 4*d* of the transmission case 4 accommodates therein a transmission shaft (to be referred to as "third transmission shaft" hereinafter) 22. A transmission gear 23 rotatably mounted on the third transmission gear shaft 22 is meshed with the transmission gear 21. As shown in FIGS. 1, 2 and 3, an output case 24 is connected to a lower portion of the fourth case portion 4*d* of the transmission case 4. This output case 24 accommodates therein a fourth transmission shaft 25 as a front wheel transmission shaft. As shown in FIG. 4, the fourth transmission shaft (front wheel transmission shaft) 25 and the third transmission shaft 22 are disposed at a right/left center C of the vehicle body.

As shown in FIGS. 2, 3 and 4, a shift gear 26 is fitted, by a splined connection, on the front wheel transmission shaft 25 to be slidable thereon and rotatable therewith. The shift gear 26 is slidable to a transmission position to be meshed with the transmission gear 23 and a released position released from this transmission gear 23. Further, the front wheel transmission shaft (fourth transmission shaft) 25 includes a detent mechanism 27 for retaining the shift gear 26 at the transmitting position (the position shown in FIG. 3) or at the released position (a position on the right side from the position shown in FIG. 3). In this embodiment, the second gear transmission mechanism 60 for transmitting the force from the second transmission shaft 18 to the front wheel transmission shaft (fourth transmission shaft) 25 consists essentially of the transmission gear (input gear) 21, the further transmission gear (relay gear) 23 and the shift gear (output gear) 26.

As shown in FIG. 4, to the left side of the output case 24, a control shaft 28 is rotatably supported. And, an arm 28*a* secured to this control shaft 28 is meshed with the shift gear 26. A control rod 29 connected to the control shaft 28 projects upward from the left side of a floor 30 (see FIG. 1). Then, when the control rod 29 is pulled up, the control shaft 28 operates the shift gear 26 into the transmitting position. When the control rod 29 is pushed down, the control shaft 28 operates the shift gear 26 into the released, i.e. non-transmitting, position. With the above-described construction, the force of the second transmission shaft 18 is transmitted to the front wheels 1 via the transmission gears 21, 22, the shift gear 26, the front wheel transmission shaft (fourth transmission shaft) 25 and a front wheel differential mechanism not shown).

Next, there will be described a rear PTO shaft 31 having a rear PTO coupling (to be referred to also as "rear PTO") at a free end thereof.

As shown in FIGS. 2, 3 and 4, this rear PTO shaft 31 is accommodated in the fourth case portion 4*d* of the transmission case 4. And, the third transmission shaft 22 is coupled via a coupling 32 to this rear PTO shaft 31. The rear PTO shaft 31 projects rearward from the fourth case portion 4*d* of the transmission case 4.

As shown in FIGS. 2 and 3, the third case portion 4*c* of the transmission case 4 accommodates therein a transmission shaft 33. A pump shaft 8*d* of a hydraulic pump 8*b* of the HST 8 is coupled via a coupling 34 to this transmission shaft 33. That is, the pump shaft 8*d* receiving the engine power and the transmission shaft 33 together constitute a PTO power train section 200 as a forward half portion of the PTO driving power train. The fourth case portion 4*d* of the transmission case 4 accommodates therein a transmission shaft (to be referred to as "first transmission shaft") 35. And, between this first transmission shaft 35 and the transmission shaft 33, there is provided a PTO clutch 36. This PTO clutch 36 includes an engaging portion 36*a* splined on the transmission shaft 33 to be rotatable therewith and slidable thereon, a further engaging portion 36*b* splined on the first transmission shaft 35 to be rotatable therewith and slidable thereon, and a spring 36*c* for urging the engaging portion 36*a* toward the further engaging portion 36*b*.

As shown in FIGS. 2 and 3, the second transmission shaft 18 rotatably mounts a PTO transmission gear 37. This PTO transmission gear 37 comprises an integrated assembly of an input gear portion 37*a*, a rear PTO gear portion 37*b* and a mid PTO gear portion 37*c*. The input gear portion 37*a* of the PTO transmission gear 37 is meshed with a transmission gear 35*a* mounted on the first transmission shaft 35. The rear PTO gear portion 37*b* is meshed with a transmission gear 38 fixed on the third transmission shaft 22. Hence, in this embodiment, a first gear transmission mechanism 50 for transmitting the force of the first transmission shaft 35 to the third transmission shaft 22 includes the transmission gear (input gear) 35*a*, the transmission gear (output gear) 38, and the input gear portion 37*a* and the rear PTO gear portion 37*b* of the PTO transmission gear 37 acting as a relay gear loosely mounted on the second transmission shaft 18.

With the above-described construction in operation, as shown in FIGS. 2 and 3, the power of the engine 3 is transmitted to the rear PTO shaft 31 via the main clutch 5, the HST 8 (the pump shaft 8*d* of the hydraulic pump 8*b* of the HST 8) (the HST 8 does not effect any change speed, but the force transmitted to the input shaft 8*a* thereof is outputted directly from the HST 8 (the output shaft 8*d* of the hydraulic pump 8*b* of the HST 8)), the transmission shaft 33, the PTO clutch 36 (under the transmitting condition), the first transmission shaft 35, the transmission gear 35*a*, the PTO transmission gear 37, the transmission gear 38 and the third transmission shaft 22.

As shown in FIGS. 2 and 3, when the engaging portion 36*a* is operated to be released from the engaging portion 36*b* in the PTO clutch 36, this PTO clutch 36 is operated into the non-transmitting condition, so that the rear PTO shaft 31 is stopped. Further, in the transmitting condition of the PTO clutch 36, if a significant load is applied to the rear PTO shaft 31, the engaging portion 36*a* is slid against the urging force of the spring 36*c* to be released from the engaging portion 36*b*, whereby the PTO clutch 36 is automatically operated into the non-transmitting condition.

Next, the mid PTO shaft 39 will be described.

As shown in FIGS. 1, 2, 3 and 4, in the output case 24, at a position downwardly of the front wheel transmission shaft 25 and offset to the right side from the right/left center C of the vehicle body, this mid PTO shaft 39 is provided. The mid PTO shaft 39 projects forwardly from the output case 24. With this, the mid PTO shaft 39 is disposed forwardly of the rear PTO shaft 31.

As shown in FIGS. 2, 3 and 4, the third transmission shaft 22 rotatably mounts a transmission gear 40. This transmission gear 40 is meshed with the mid PTO gear portion 37*c* of the PTO transmission gear 37. The front wheel transmission shaft 25 rotatably mounts a large mid gear 41, which is meshed with the transmission gear 40. The mid PTO shaft 39 rotatably mounts a small transmission gear 42, which is meshed with the mid gear 41.

As shown also in FIGS. 2, 3 and 4, a shift member 43 is splined on the mid PTO shaft 39 to be rotatable therewith and a slidable thereon. This shift member 43 is slidable to a transmitting position to be meshed with the transmission gear (input gear) 42 and a released position released therefrom. Further, the mid PTO shaft 39 includes a detent mechanism 44 for retaining the shift member 43 at the transmitting position (the position shown in FIG. 3) or the non-transmitting position (position on the right slide from the position shown in FIG. 3).

Hence, in this embodiment, a third gear transmission mechanism 70 for transmitting the force of the first gear transmission mechanism 50 i.e. the force from the PTO transmission gear 37, to the mid PTO shaft 39 includes the transmission gear (output gear) 42 having the shift member 43, the transmission gear (first relay gear) 40 meshed with the mid PTO gear portion 37*c* of the PTO transmission gear 37 and loosely mounted on the third transmission shaft 22, and the mid gear (second relay gear) 41 meshed with the first relay gear 40 and the output gear 42 and loosely mounted on the fourth transmission shaft 25.

As shown in FIG. 4, to the right side of the output case 24, a control shaft 45 is rotatably supported. And, an arm 45*a* secured to this control shaft 45 is engaged with the shift member 43. A control rod 46 connected to the control shaft 45 projects upward from the left side of the floor 30 (see FIG. 1). Then, when the control rod 46 is pulled up, the control shaft 45 operates the shift member 43 into the transmitting position. When the control rod 46 is pushed down, the control shaft 45 operates the shift member 43 into the released, i.e. non-transmitting, position.

With the above-described construction, when the force is transmitted to the rear PTO shaft 31, at the same time, as shown in FIGS. 2 and 3, the force of the first transmission shaft 35 is transmitted to the mid PTO shaft 39 via the transmission gear 35*a*, the PTO transmission gear 37, the transmission gear 40, the mid gear 41, the input gear 42 and the shift member 43. Further, when the PTO clutch 36 is operated into the non-transmitting condition, the rear PTO shaft 31 and the mid PTO shaft 39 are stopped. Further, in the transmitting condition of the PTO clutch 36, if a significant load is applied to the rear PTO shaft 31 or the mid PTO shaft 39, the engaging portion 36*a* is slid against the urging force of the spring 36*c* to be released from the engaging portion 36*b*, whereby the PTO clutch 36 is automatically operated into the non-transmitting condition. Moreover, under the transmitting condition of the PTO clutch 36 (i.e. the condition when the force is transmitted to the rear PTO shaft 31 and the mid PTO shaft 39), if the shift member 43 is operated into the non-transmitting condition, the mid PTO shaft 39 alone can be stopped.

In this case, as shown in FIGS. 2 and 3, for instance, if the rear PTO gear portion 37*b* of the PTO transmission gear 37 is designed to have '15' (fifteen) teeth and the transmission gear 38 is designed to have '27' (twenty seven) teeth, then, the mid PTO gear portion 37*c* of the PTO transmission gear 37 is designed to have '22' (twenty two) teeth, the transmission gear 40 is designed to have '21' (twenty one) teeth, the mid gear 41 is designed to have '36' (thirty six) teeth, and the input gear 42 is designed to have '11' (eleven) teeth, respectively. With these settings, a force of a higher speed than the rear PTO shaft 31 is transmitted to the mid PTO shaft 39 (for instance, 540 rpm for the rotation of the rear PTO shaft 31 and 2000 rpm for the rotation of the mid PTO shaft 39).

Figure 5:
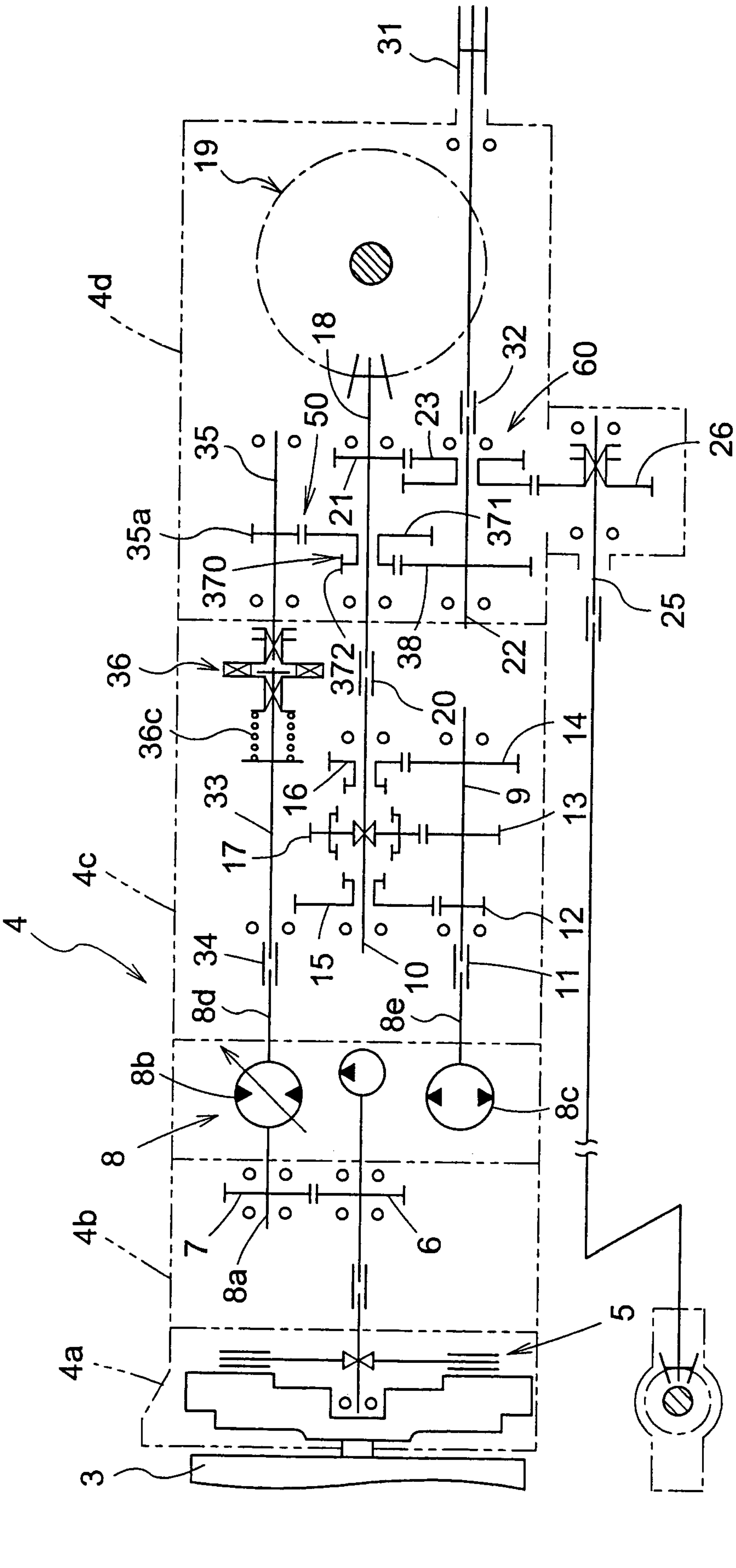
FIG. 5 is a schematic of a transmission relating to a further embodiment of the invention.
Figure 6:
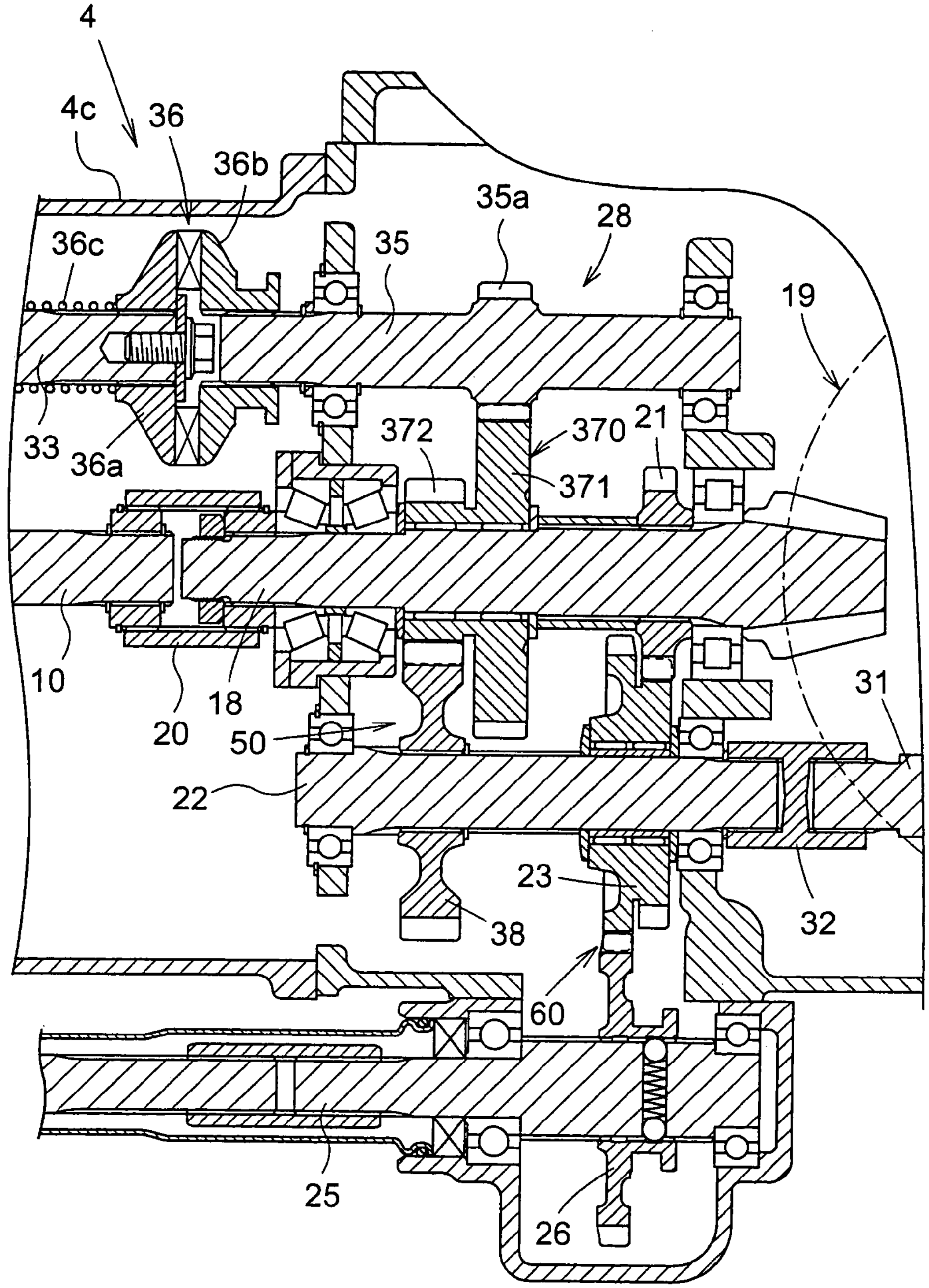
FIG. 6 is a section view showing a rear area of the transmission relating to the further embodiment.

A further embodiment of the transmission relating to the present invention will be described next with reference to FIGS. 5 and 6.

Relative to the foregoing embodiment, this further embodiment differs in that the mid PTO shaft is eliminated. Therefore, the third gear transmission mechanism 70 is also absent in this further embodiment. Correspondingly, the PTO transmission gear 37 used in the foregoing embodiment comprising the integrated assembly of the input gear portion 37*a*, the rear PTO gear portion 37*b* and the mid PTO gear portion 37*c* is now replaced by a different PTO transmission gear 370 comprising an integrated assembly of an input gear portion 371 and a rear PTO gear portion 372 alone. The rest of the construction is identical to that of the foregoing embodiment, hence, will not be described, with only the reference numerals being provided in the figures.

In addition to the tractor described above, the invention's transmission can be applied also to any other agricultural vehicle or machinery such as a rice planter, a farm managing machine or vehicle or to any construction work machine or vehicle.

The present invention may be embodied in any other manner than described above. Various modifications thereof will be apparent to those skilled in the art, without departing the essential features thereof defined in the appended claims.

What is claimed is:

1. A transmission for a work vehicle having PTO function, comprising:

a first transmission shaft for receiving engine power through a PTO power train;

a second transmission shaft for receiving the engine power through a traveling power train, said second transmission shaft being coupled to a rear differential mechanism;

a third transmission shaft coupled to a rear PTO;

a fourth transmission shaft for receiving force from the second transmission shaft;

a first gear transmission mechanism for transmitting the force from the first transmission shaft to the third transmission shaft;

said first gear transmission mechanism including;

a first input gear mounted on the first transmission shaft, a first output gear mounted on the third transmission shaft, and a relay gear mounted on and rotatable with respect to the second transmission shaft for transmitting the force from the first input gear to the first output gear; and a second gear transmission mechanism for transmitting the force from the second transmission shaft to the fourth transmission shaft;

said second gear transmission mechanism including;

a second input gear mounted on the second transmission shaft, a second output gear mounted on the fourth transmission shaft, and a further relay gear mounted on and rotatable with respect to the third transmission shaft for transmitting the force from the second input gear to the second output gear.

2. The transmission according to claim 1, wherein said fourth transmission shaft comprises a front wheel transmission shaft for transmitting force to front wheels.

3. The transmission according to claim 1, further comprising:

a mid PTO shaft; and a third gear transmission mechanism for transmitting the force from the first gear transmission mechanism to the mid PTO shaft;

said third gear transmission mechanism including;

a third output gear mounted on the mid PTO shaft, a first relay gear mounted on and rotatable with respect to the third transmission shaft for receiving the force from the first gear transmission mechanism, and a second relay gear mounted on and rotatable with respect to the fourth transmission shaft and meshing with said first relay gear and said third output gear.

4. The transmission according to claim 1, wherein said first transmission shaft mounts a PTO clutch.

5. The transmission according to claim 3, wherein further comprising a mid PTO clutch interposed between the third gear transmission mechanism and the mid PTO shaft.

6. The transmission according to claim 3, wherein said first relay gear of the first gear transmission mechanism includes a gear portion meshing with the first input gear of the first gear transmission mechanism, a further gear portion meshing with the first output gear of the first gear transmission mechanism and a still further gear portion meshing with the first relay gear of the third gear transmission mechanism.

* * * * *

UNITED STATES PATENT AND TRADEMARK OFFICE

CERTIFICATE OF CORRECTION

PATENT NO. : 6,986,295 B2
APPLICATION NO. : 10/796554
DATED : January 17, 2006
INVENTOR(S) : Kajino et al.

It is certified that error appears in the above-identified patent and that said Letters Patent is hereby corrected as shown below:

Column 6,
Lines 15-16, "gears 21, 22" should read -- gears 21, 23 --.

Signed and Sealed this

Fourth Day of July, 2006

JON W. DUDAS
*Director of the United States Patent and Trademark Office*